N. G. NUMSEN.

Improvement in Soldering-Irons.

No. 127,914.            Patented June 11, 1872.

Witnesses:
G. Matthys.
Thos. D. D. Avrand

Inventor:
Nathaniel G. Numsen
per
Attorneys.

UNITED STATES PATENT OFFICE.

NATHANIEL G. NUMSEN, OF BALTIMORE, MARYLAND, ASSIGNOR TO WM. NUMSEN & SONS, OF SAME PLACE.

IMPROVEMENT IN SOLDERING-IRONS.

Specification forming part of Letters Patent No. 127,914, dated June 11, 1872.

Specification describing an Improvement in Soldering-Irons, invented by NATHANIEL G. NUMSEN, of Baltimore, in the county of Baltimore and State of Maryland.

The invention consists in making a soldering-tool in three main parts, as hereinafter described.

Figure 1:
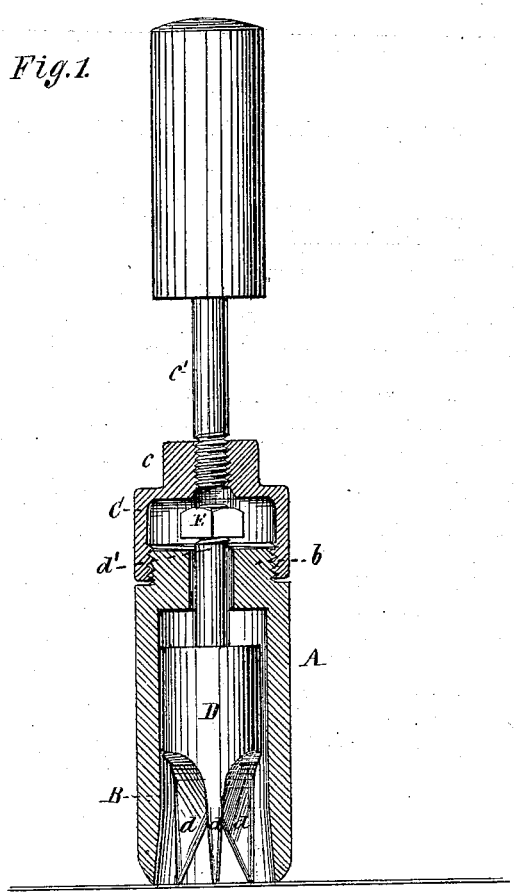
Figure 2:
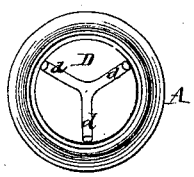

Figure 2 is an end view of the weighted holder and soldering-iron. Fig. 1 is a vertical and central section of the iron, with loose self-adjusting holder applied thereto.

A is the soldering-iron, formed of a tubular body, B, having threaded and perforated top $b$, and a cap, C, having the dome $c$ and long shank $c'$, on which is fitted the usual wooden handle. D is the holder, made of sufficient weight to press the can firmly by its own gravity. $d$ are the prongs, which I preferably employ, but they form no part of my invention, since any other bearing-surface will answer the purpose. The upper end $d'$ is threaded, and receives a nut, E. The end $d'$ of holder is first inserted at the lower end of tube B, and up through the perforation of top $b$, the nut E then inserted, and the cap C screwed on, when the iron is ready to be heated.

The soldering-iron A being then taken from the fire, the nut E rests on top $b$ of tube B, and prevents the holder D from being dropped out, while, when placed on the top of can which is to be soldered, the nut slides up into dome $c$ of cap C, and allows holder D to adjust itself to the can.

Having thus described my invention, what I claim as new, and desire to protect by Letters Patent, is—

A soldering-iron, consisting of tube B, cap C, and holder D, constructed and arranged substantially as and for the purpose described.

N. G. NUMSEN.

Witnesses:
SOLON C. KEMON,
THOS. D. D. OURAND.